(12) United States Patent
Fujita et al.

(10) Patent No.: US 6,767,175 B2
(45) Date of Patent: Jul. 27, 2004

(54) FORKLIFT

(75) Inventors: Tutomu Fujita, Kyoto (JP); Yasunobu Tomiyama, Kyoto (JP); Kazumasa Kokura, Kyoto (JP)

(73) Assignee: Nippon Yusoki Co., Ltd., Kyoto (JP)

( * ) Notice: Subject to any disclaimer, the term of this patent is extended or adjusted under 35 U.S.C. 154(b) by 0 days.

(21) Appl. No.: 10/318,229

(22) Filed: Dec. 13, 2002

(65) Prior Publication Data

US 2003/0156934 A1 Aug. 21, 2003

(30) Foreign Application Priority Data

| Feb. 18, 2002 | (JP) | P2002-040759 |
|---|---|---|
| Mar. 1, 2002 | (JP) | P2002-055945 |
| Mar. 4, 2002 | (JP) | P2002-056716 |
| Mar. 5, 2002 | (JP) | P2002-059323 |
| Mar. 6, 2002 | (JP) | P2002-060131 |
| Mar. 12, 2002 | (JP) | P2002-066393 |

(51) Int. Cl.[7] ................................................. B66F 9/10
(52) U.S. Cl. ........................ 414/631; 414/619; 414/622
(58) Field of Search ................................ 414/618, 619, 414/621, 622, 629, 631, 641, 634, 620, 628

(56) References Cited

U.S. PATENT DOCUMENTS 2,893,582 A * 7/1959 Parcell ....................... 414/619
4,415,302 A * 11/1983 Brouwer et al. ............ 414/631

FOREIGN PATENT DOCUMENTS

| JP | 9-12292 A | 1/1997 |
|---|---|---|
| JP | 10-316380 A | 12/1998 |

* cited by examiner

*Primary Examiner*—James R. Bidwell
(74) *Attorney, Agent, or Firm*—Sughrue Mion, PLLC

(57) ABSTRACT

A forklift having a pallet lock device. On an upper face of a top end of a lock bar to lock a pallet, a tapered portion is disposed. When a fork is inserted into the pallet, the tapered portion comes into contact with an end face of the pallet and the lock bar rotates downward. When a landing sensor is turned on by a magnet disposed on the lock bar, the lock bar is immediately driven and the locking operation is started. Then, the top end of the lock bar pushes or comes into pressure contact with an upper face of a lower deck board of the pallet, and the pallet is locked.

17 Claims, 14 Drawing Sheets

FORKLIFT

BACKGROUND OF THE INVENTION

1. Field of the Invention

The present invention relates to a forklift provided with a pallet lock device for locking a pallet lifted by a fork to prevent the pallet from being oscillated or accidentally being displaced while it is being conveyed.

2. Description of the Related Art

FIG. 15 is a side view schematically showing a conventional order picking truck 1. In the order picking truck 1, a fork 2 and an operator's stand 3 are integrally elevated so that reloading of a load is conducted at a high position. Reference numeral 4 is a pedestal on which an operator gets in the operator's stand 3. A pallet 6 into which the fork 2 is inserted is locked by a lock bar 5 provided at the rear of the pedestal 4, that is, provided on the fork 2 side of the order picking truck 1. The lock bar 5 is supported by the pedestal 4 and is rotatable upward and downward. Usually, the lock bar 5 is set parallel with the fork 2. After the lock bar 5 is inserted into a hole of the pallet 6 together with the fork 2, the lock bar 5 is rotated downward by operation conducted by an operator. In this way, the lock bar 5 pushes a lower deck board of the pallet 6 from above, so that the pallet 6 is locked. In order to release the lock of the lock bar 5, the operator conducts operation reverse to that conducted in the case of locking. By the reverse operation, the lock bar 5 is rotated upward and returned to the initial horizontal posture, so that the lock is released. The operator manually conducts the locking and unlocking operation by controlling a lever and a pedal arranged in the operator's stand 3.

When the pallet 6 is oscillated on the fork 2 while the operator conducts reloading at a high place, there is a possibility that the load falls. Thus, the pallet should be locked. The lock is released when the fork is drawn out from the pallet, so that the pallet is placed on a shelf or ground.

As above described, the locking operation is very important. Accordingly, the operator positively executes the locking operation. However, the unlocking operation is not necessarily conducted at an appropriate timing. If unlocking operation is incompletely conducted when the fork is drawn out from the pallet which is set on a shelf, the fork or lock device is brought into contact with the pallet so that the pallet is drawn out together with the fork and falls from the shelf. If the lock is released before the pallet is surely placed on the shelf, the pallet becomes unbalanced and the pallet is oscillated on the fork depending upon a state of the load placed on the pallet, and there is a possibility that the load collapses.

Also, in case where the pallet 6 is locked according to the operator's will, there is a possibility that the operator forgets to conduct the locking operation. In this case, the pallet 6 becomes unstable and the load may collapse.

SUMMARY OF THE INVENTION

The present invention has been accomplished to solve the above problems. An object of the present invention is to provide a forklift capable of positively releasing the lock of a pallet at an appropriate timing.

Another object of the present invention is to provide a forklift capable of positively locking the pallet at an appropriate timing.

According to a first aspect of the present invention, there is provided a forklift comprising: a fork to be inserted into a pallet; a hoisting device for hoisting the fork; and a pallet lock device for locking the pallet, the pallet lock device having a lock bar which is pushable a lower deck board of the pallet to lock the pallet, wherein the pallet lock device releases the lock of the pallet when an intensity of the force given to the lock bar from the lower deck board exceeds a predetermined value.

According to a second aspect of the present invention, the pallet lock device releases the lock of the pallet when the lock bar is displaced upward by the force given from the lower deck board.

According to a third aspect of the present invention, the pallet lock device comprises: a lock bar driver for moving the lock bar upward and downward; and a detector for detecting an upward displacement of the lock bar caused by the force given from the lower deck board, wherein the lock bar driver releases the lock of the pallet when the detector detects the upward displacement of the lock bar.

According to a fourth aspect of the present invention, the pallet lock device releases the lock of the pallet when the fork is operated to a state in which the fork is drawable out from the pallet.

According to the first to fourth aspects of the invention, the lock bar pushing the lower deck board of the pallet is given an upward force from the lower deck board when the fork is lowered and the pallet is placed on a shelf or ground. When an intensity of this upward force given from the lower deck board to the lock bar becomes higher than a predetermined value, it is judged that the pallet is placed, and the lock is automatically released. Therefore, it is unnecessary for an operator to manually conduct an unlocking operation. The lock is appropriately released, and the above problems are not caused. Since the unlocking operation is conducted after the pallet is placed on a shelf etc., the load on the pallet does not become unbalanced and does not collapse. The predetermined value must be set at a value higher than an intensity of the force given from the lower deck board to the lock bar when the forklift runs and the fork is oscillated upward and downward. If the predetermined value is set at an excessively low value, the lock is released each time the forklift runs and the fork is oscillated. Accordingly, the predetermined value must be set based on a value of the upward force given from the lower deck board to the lock bar when the forklift is running, which can be calculated, actually measured or estimated. And the predetermined value must be set at a value higher than the value of the upward force. The detector for detecting the force given from the lower deck board to the lock bar may be a sensor capable of detecting stress acting upward on the lock bar. Alternatively, the detector may be a sensor or switch for detecting an upward displacement of the lock bar which is displacably supported so that it can be displaced upward according to the force given from the lower deck board. Alternatively, the detector may be provided separately from the lock bar for detecting the force. The displacement of the lock bar may be electrically detected. Alternatively, the displacement of the lock bar may be detected by a mechanical means; which is mechanically linked with the displacement. The lock bar may be urged by a spring which pushes the lock bar downward when locking the pallet and pushes the lock bar upward when unlocking the pallet, so that lock bar is rotated.

According to a fifth aspect of the present invention, the lock bar is supported on the pallet lock device via an elastic member for elastically pushing the pallet.

According to the fifth aspect, the pallet is elastically pushed by the elastic member. Therefore, the lock bar can be easily displaced upward by a force given from the lower deck board. Further, dimensional error of the pallet hole in the vertical direction can be is absorbed by the elastic member.

According to a sixth aspect of the present invention, there is provided a forklift comprising: a fork to be inserted into a pallet; a hoisting device for hoisting the fork; a pallet lock device for locking the pallet; a pallet detector for detecting an insertion of the fork into the pallet; and an upward movement detector for detecting an upward movement of the fork, wherein the pallet lock device locks the pallet after the pallet detector detects the insertion of the fork into the pallet and the upward movement detector detects the upward movement of the fork of a predetermined distance.

According to the sixth aspect, after the pallet detector detects the insertion of the fork into the pallet and the upward movement detector detects an upward movement of the fork, the moving distance of which is not less than a predetermined value, the pallet lock device is driven and the pallet is locked. Therefore, the locking operation is automatically conducted irrespective of the operator's will. Accordingly, there is no possibility that the operator forgets to lock the pallet, that is, there is no possibility of the occurrence of the above problems which are caused when the operator forgets to lock the pallet. Since the pallet locking operation is conducted after the pallet detector detects the insertion of the fork into the pallet, there is no possibility that the locking operation is conducted while the fork is not inserted into the pallet. There is no possibility of making a mistake of locking operation, thereby failure of the pallet lock device is prevented. Further, the locking operation of the pallet is conducted when an upward movement of the fork, the moving distance of which is not less than a predetermined value, is detected. Therefore, the locking operation can be positively conducted irrespective of the height of a place to which the pallet is conveyed. The pallet is not locked when the fork reaches a predetermined height from the ground but the pallet is locked when the fork is lifted by a distance not less than a predetermined value from the height where the pallet detector detects the insertion of the pallet. Say the predetermined value is set at 20 cm and the pallet is placed at a position of 100 cm height from the ground, the locking operation is automatically conducted when the pallet is lifted by the fork to a position of 120 cm height from the ground. In the same manner, in case where the pallet is placed at a position of 150 cm height from the ground, the locking operation is automatically conducted when the pallet is lifted by the fork to a position of 170 cm height from the ground. Accordingly, even in case where a plurality of pallets are piled, each pallet can be positively locked irrespective of the height.

According to a seventh aspect of the present invention, the upward movement detector detects the upward movement of the fork of the predetermined distance based on an operating time of the hoisting device.

According to the seventh aspect, in case where the lifting speed of the fork by the hoisting device is constant, it is possible to detect that the fork has reached a position, the height of which is not less than a predetermined value, by the product of the lifting speed and the operating time of the hoisting device. This enables a simple and inexpensive structure. In case where the lifting speed of the fork is not constant, it is possible to add a sensor for detecting the lifting speed and detect that the fork has reached a position, the height of which is not less than a predetermined value, by the product of the output of the sensor and the operating time of the hoisting device. In case where the hoisting device is operated during the continuous switch-on operation conducted by the operator, the above operating time is the same as the switch-on time. This structure can be easily implemented by a well known electric means.

According to an eighth aspect of the present invention, the hoisting device comprises a motor which is a drive source for hoisting the fork, wherein the upward movement detector detects the upward movement of the fork of the predetermined distance based on number of revolutions of the motor.

According to the eighth aspect, the lifting distance of the fork is substantially proportional to the number of revolutions of the motor. When the number of revolutions is detected and counted by an encoder and this counted value reaches a predetermined value, it is judged that the fork has reached a position, the height of which is not less than a predetermined value. This enables a simple and inexpensive structure.

According to a ninth aspect of the present invention, the pallet lock device comprises: a lock bar which is pushable a lower deck board of the pallet; and a lock bar driver for moving the lock bar upward and downward.

According to the ninth aspect, the pallet is locked when the lower deck board of the pallet is pushed from above by the lock bar. Therefore, the pallet can be positively locked, and further a load can be placed on the front face of an upper deck board on the pallet. Since the lock bar is driven upward and downward by the lock bar driver, the lock bar can be automatically driven.

According to a tenth aspect of the present invention, the pallet lock device releases the lock of the pallet based on an upward force given from the lower deck board to the lock bar.

According to the tenth aspect, the lock of the pallet is automatically released when the pallet on the fork is placed on the ground. Therefore, the pallet can be easily released from the fork.

According to an eleventh aspect of the present invention, there is provided a forklift comprising: a fork to be inserted into a pallet; a hoisting device for hoisting the fork; a pallet lock device for locking the pallet; and a pallet detector for detecting an insertion of the fork into the pallet, wherein the pallet lock device locks the pallet when the pallet detector detects that the pallet reaches to a predetermined position close to a base end portion of the fork.

According to a twelfth aspect of the present invention, the pallet lock device comprises: a lock bar which is pushable a lower deck board of the pallet, the lock bar having a tapered portion; and a lock bar driver for moving the lock bar upward and downward, wherein the tapered portion comes into contact with the pallet as the fork is inserted into the pallet and thereby the lock bar is tilted, wherein the pallet detector detects that the pallet reaches a predetermined position based on a tilting movement of the lock bar.

According to the eleventh and twelfth aspects, when the fork is inserted into the pallet, the pallet is automatically locked by the pallet lock device. Accordingly, there is no possibility of the occurrence of problems caused when the operator forgets to conduct pallet locking operation. Since the lock of the pallet is conducted when the pallet reaches to a predetermined position close to the base end portion of the fork, there is no possibility that the pallet is locked while the fork is being insufficiently inserted. Consequently, the fork is inserted into a sufficiently deep portion of the pallet and the pallet is locked by the pallet lock device. Therefore, sliding and oscillation of the pallet can be positively suppressed.

According to a thirteenth aspect of the present invention, there is provided a forklift comprising: a fork to be inserted into a pallet; a hoisting device for hoisting the fork; a pallet lock device for locking the pallet; and a pallet detector for detecting an insertion of the fork into the pallet, wherein the pallet lock device locks the pallet when the fork is hoisted by the hoisting device in state where the pallet detector detects the insertion of the fork into the pallet.

According to the thirteenth aspect, the pallet is automatically locked when the hoisting of the pallet is started. Accordingly, there is no possibility of the occurrence of problems caused when an operator forgets to lock the pallet. Further, it is possible to positively prevent the collapse of the load on the pallet and prevent the operator from falling from the pallet.

According to a fourteenth aspect of the present invention, there is provided a forklift comprising: a fork to be inserted into a pallet; a hoisting device for hoisting the fork; a pallet lock device for locking the pallet; and a fork position detector, wherein the pallet lock device locks the pallet when the fork position detector detects that the fork inserted into the pallet is located at the position close to the lower face of the upper deck board.

According to the fourteenth aspect, after the fork has been inserted into the pallet, when the fork is lifted to a position close to the lower face of the upper deck board of the pallet, the pallet is automatically locked by the pallet lock device. Accordingly, there is no possibility of the occurrence of problems caused when the operator forgets to lock the pallet. Since the pallet is locked when the fork is located at a position close to the lower face of the upper deck board of the pallet, oscillation of the pallet caused by the locking operation is reduced by the contact of the upper deck board with the fork. Accordingly, oscillation of the pallet can be positively prevented from the beginning to the end of the locking operation.

According to a fifteenth aspect of the present invention, there is provided a forklift further comprising a pallet detector for detecting an insertion of the fork into the pallet, wherein the pallet lock device locks the pallet when the pallet detector detects the insertion of the fork into the pallet and the fork position detector detects that the fork inserted into the pallet is located at a position close to a lower face of an upper deck board of the pallet.

According to the fifteenth aspect, there is no possibility that the pallet lock device is erroneously operated. Only when the fork is correctly inserted into the pallet, the pallet can be locked.

According to a sixteenth aspect, there is provided a forklift comprising: a fork to be inserted into a pallet; a hoisting device for hoisting the fork; and a pallet lock device for locking the pallet, wherein the pallet lock device comprises: a lock bar which is movable to a first position protruding from an upper face of the fork, a second position located lower than the first position, and a third position located lower than the second position and coming into contact with a lower deck board of the pallet; a detector for detecting a displacement of the lock bar from the first position to the second position; and a lock bar driver for displacing the lock bar to the third position when the detector detects the upward displacement of the lock bar.

According to the sixteenth aspect, when the fork is inserted into the pallet, the lock bar is located at the first position where the lock bar protrudes from an upper face of the fork. When the lock bar comes into contact with the pallet, it is pushed downward and displaced to the second position. Insertion of the pallet is detected by the detector as the lock bar displaces from the first position to the second position, and then, the lock bar driver is driven. The lock bar driver displaces the lock bar from the second position to the third position which is lower than the second position, so that the lock bar comes into contact with the lower deck board of the pallet. In this way, the pallet is locked. In other words, insertion of the fork into the pallet is automatically detected, and the pallet is automatically locked according to the result of detection. Therefore, problems caused when an operator forgets to lock can be positively solved. One lock bar is used for fulfilling two purposes, one is to detect insertion of the fork into the pallet and the other is to push the pallet. This enables a simplified structure.

According to a seventeenth aspect of the present invention, the fork lift is an order picking truck having an operator's stand which is hoisted together with the fork, wherein the pallet lock device is disposed on the operator's stand.

DETAILED DESCRIPTION OF THE PREFERRED EMBODIMENTS

Figure 1:
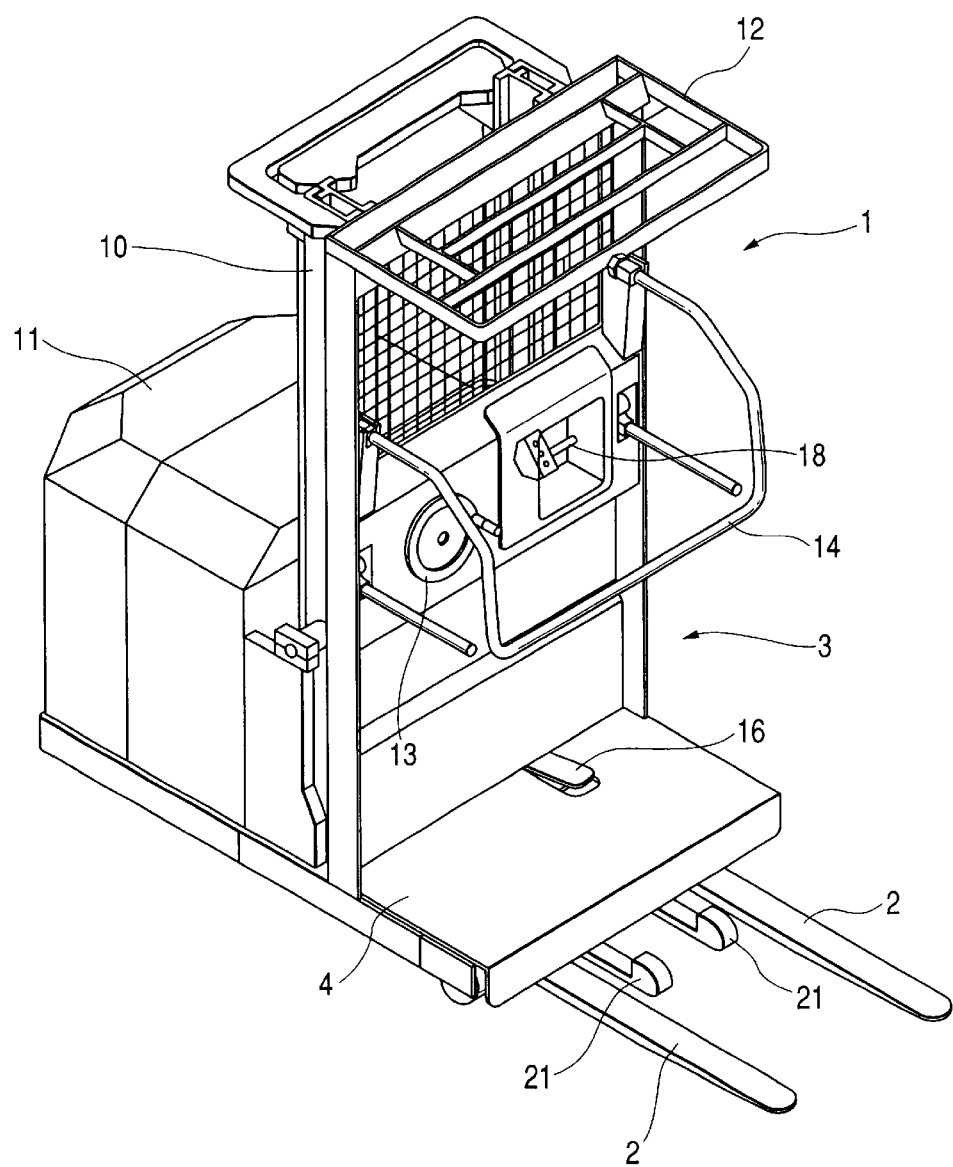
FIG. 1 is a perspective view of a forklift of the present invention, wherein the view is taken from the rear of the forklift.
Figure 2:
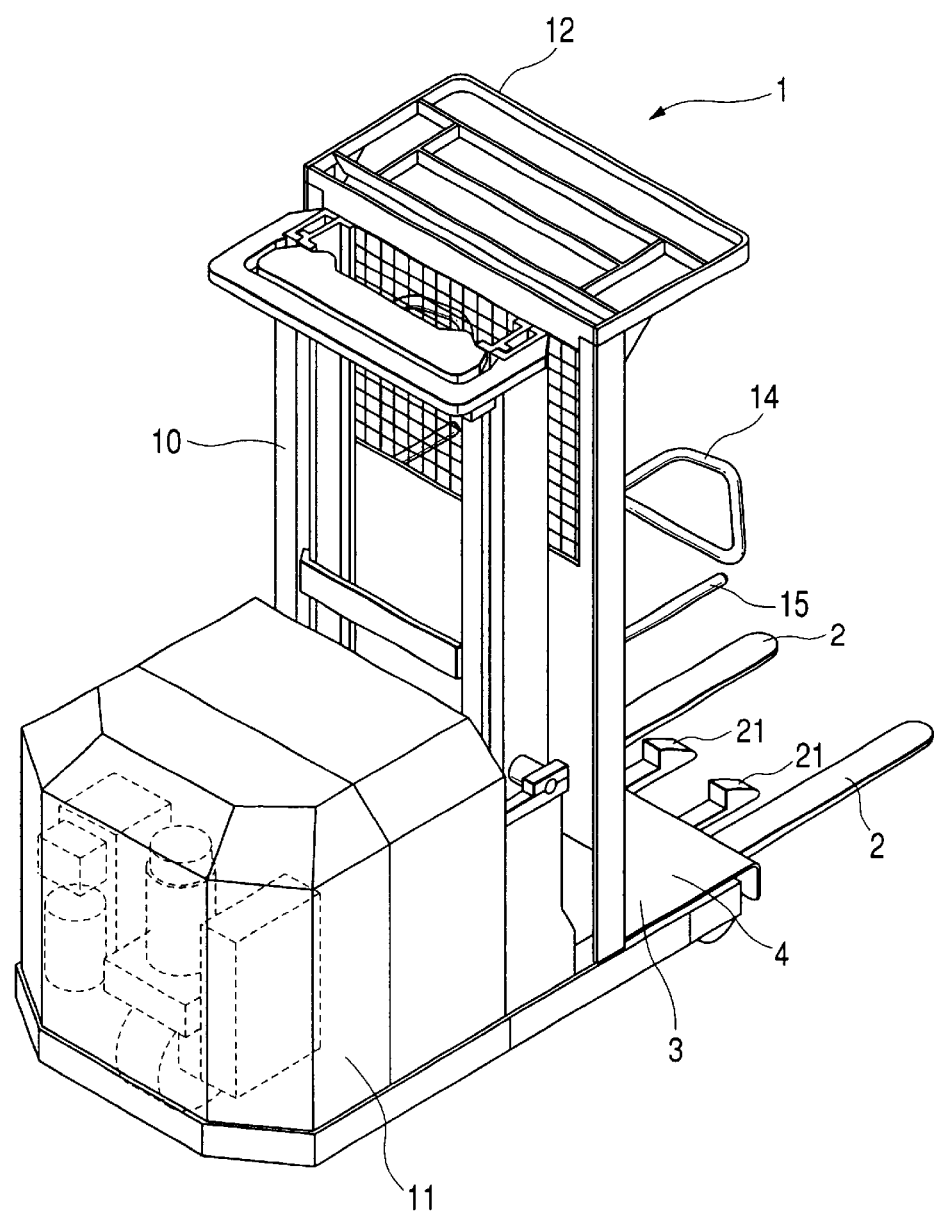
FIG. 2 is a perspective view of the forklift, wherein the view is taken from the front of the forklift.

Referring to the drawings, embodiments of the present invention will be described below in detail. Like reference characters are used to indicate like parts and the detailed explanations will be omitted. FIGS. 1 and 2 are perspective views of a forklift 1 called an order picking truck which enables reloading at a high place while an operator gets on a operator's stand 3 or on a pallet 6.

At the center of the forklift 1, there is provided a mast device 10. The operator's stand 3, on which an operator gets, is supported by the mast device 10 and elevated along the mast device 10. At the rear of the operator's stand 3, there are provided a pair of forks 2 which are fixed to the operator's stand 3 and protrude toward the rear side. On the opposite side of the forks 2, that is, in the front side of the vehicle body, there is provided a drive section 11 including a motor for driving the vehicle body and a hydraulic motor for driving a loading and unloading device. In an upper portion of the operator's stand 3, there is provided a head guard 12 for protecting the operator. At a left portion of the front of the operator's stand 3, there is provided a handle 13. At a right portion of the front of the operator's stand 3, there is provided an operation unit 18 including an accelerator for driving the vehicle body forwards and backwards, and a switch for elevating the operator's stand 3 and the fork 2. Further, in an upper portion of the operator's stand 3, there is provided a substantially C-shaped safety bar 14 for protecting the operator. On the floor of the operator's stand 3, that is, on an upper face of a pedestal 4, there is provided a brake pedal 16.

Figure 3:
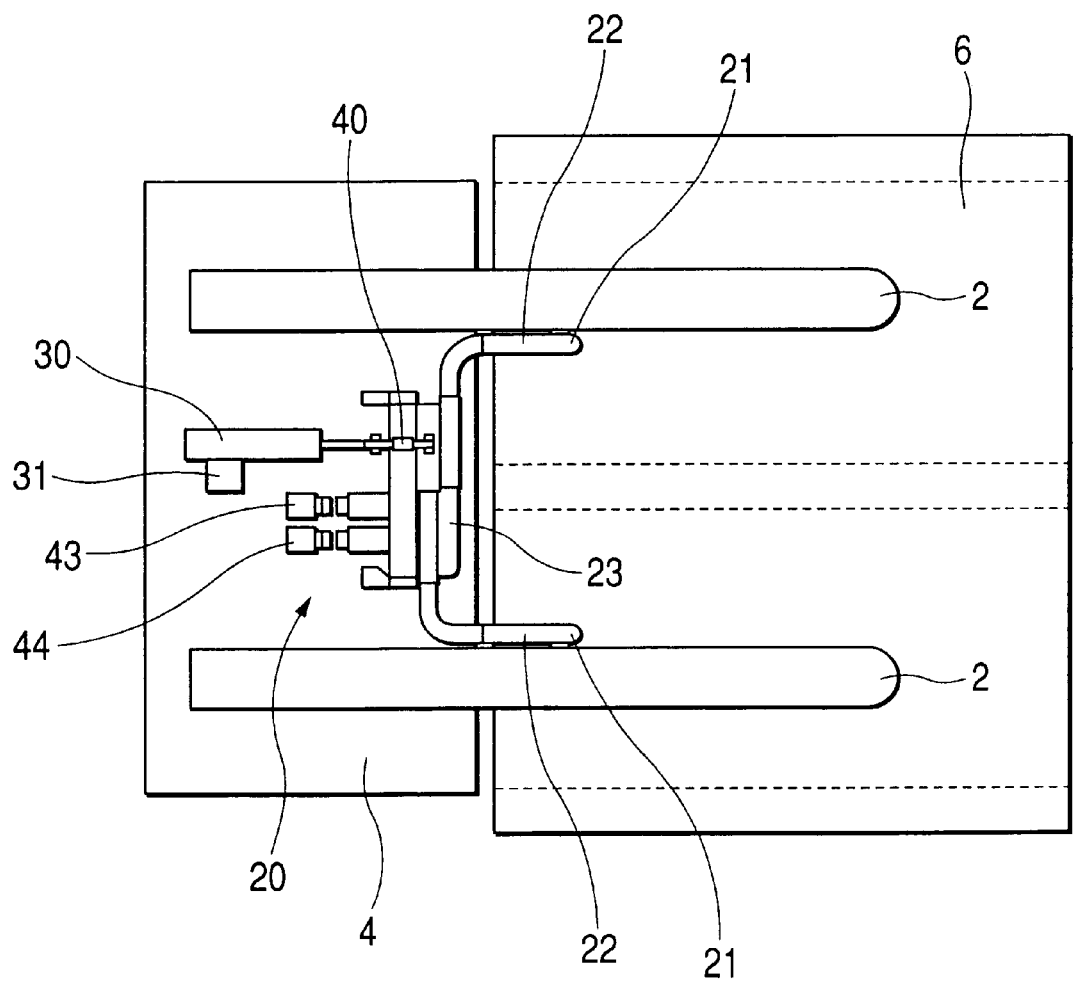
FIG. 3 is a plan view showing a pallet lock device of the forklift.
Figure 4:
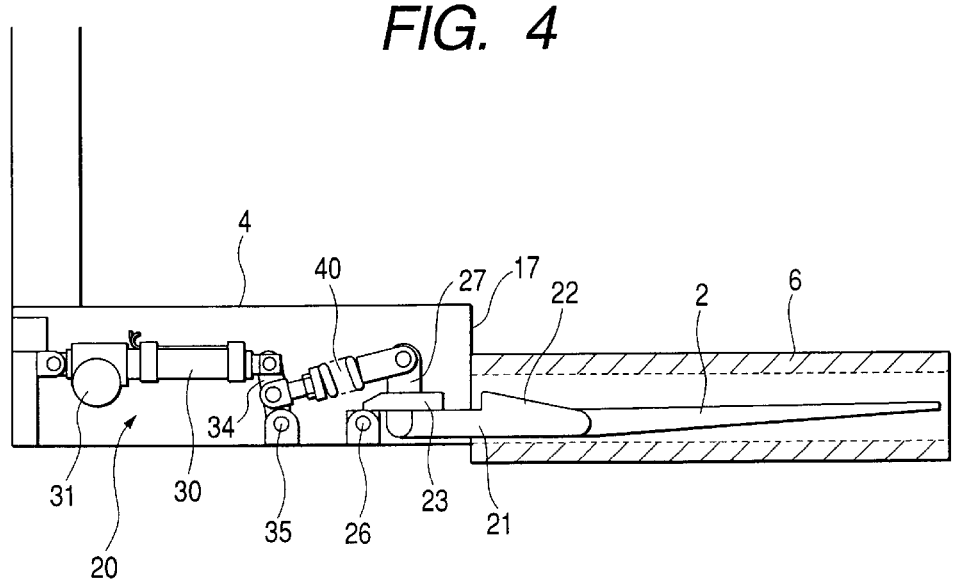
FIG. 4 is a side view showing the pallet lock device.
Figure 5:
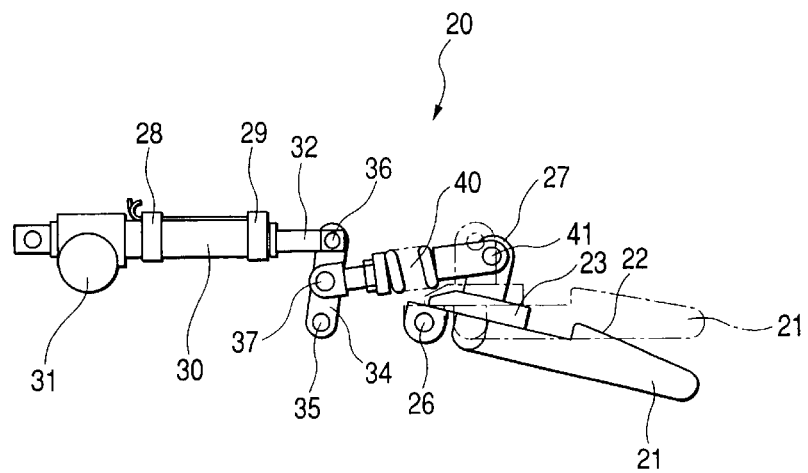
FIG. 5 is a partial side view of the pallet lock device.

Referring to FIGS. 3 to 5, the structure of a pallet lock device will be described below. A drive unit (lock bar driver) of the pallet lock device 20 is accommodated in the flat pedestal 4 arranged in a lower portion of the operator's stand. A lock bar 21 to lock the pallet protrudes from a rear plate 17 of the pedestal 4 in parallel with the fork 2. Each lock bar 21 is formed into the shape of a letter "L" and two lock bars 21 are opposed to each other when they are viewed on a plan view. A base end portion of each lock bar 21 is attached to a bracket 23 with a bolt, and two lock bars 21 entirely form a substantial C-shape. Upward portions of the top end portions of both lock bars 21 are formed into a tapered portion 22 in which the top end section is tapered downward. One end portion of the bracket 23 is pivotally supported by the shaft 26 horizontally arranged on the pedestal 4. The above structure enables the lock bar 21 to be rotated about the shaft 26.

In the pedestal 4, there is provided a power cylinder 30 which is arranged in a longitudinal direction of the vehicle body. The rod 32 of this power cylinder 30 can be extended and contracted via a gear not shown when a motor 31 attached to an end portion of the power cylinder 30 is rotated in the normal and the reverse direction. On both sides of the power cylinder 30, there are provided an entry detection sensor 28 to detect a state in which the rod 32 is accommodated, and a delivery detection sensor 29 to detect a state in which the rod 32 is extended, respectively. For example, these entry detection sensor 28 and delivery detection sensor 29 are composed of a magnetic sensor.

A top end of the rod 32 is connected with a pair of links 34 via a shaft 36. A lower end of each link 34 is pivotally connected with a shaft 35 supported by the pedestal 4. The center of the link 34 is pivotally connected with one end of a damper 40 via a shaft 37. The other end of the damper 40 is pivotally connected with a protrusion 27, which protrudes from an upper face of the bracket 23, via a shaft 41. As described later, this damper 40 absorbs a force given to the lock bar 21 when the pallet 6 is locked. The damper 40 includes a coil spring which is arranged inside and serves as an elastic member.

When the rod 32 is accommodated in the power cylinder 30 as shown in FIG. 4, the link 34 is located on the left with respect to the shaft 35, and further the damper 40 connected with the link 34 is pulled to the left. Hence, the bracket 23 and lock bar 21 are rotated counterclockwise about the shaft 26. Therefore, the lock bar 21 is kept horizontal at the same position as that of the fork 2 on a side view. When electric power is supplied to the motor 31 under the above condition, the rod 32 of the power cylinder 30 is extended. Then, as shown in FIG. 5, the link 34 is pushed to the right round the shaft 35, and further the damper 40 is pushed to the right. Hence, the bracket 23 is rotated clockwise round the shaft 26. That is, as shown by a solid line, the lock bar 21 is rotated clockwise round the shaft 26, and a top end on the lower face side of the lock bar 21 pushes or comes into pressure contact with an upper face of a lower deck board provided on the lower side of the pallet 6. In this way, the pallet 6 is locked by the lock bar 21.

On the contrary, when a direction of the voltage impressed upon the motor 31 is reversed, the rod 32 of the power cylinder 30 is accommodated into the power cylinder 30, and the link 34 is rotated to the left round the shaft 35 and the damper 40 is also moved to left. Hence, the bracket 23 and the lock bar 21 is rotated counterclockwise round the shaft 26 and returned to the horizontal state.

Figure 7A:
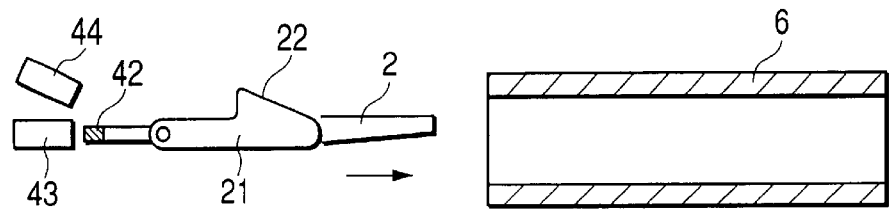
FIGS. 7(a) to 7(d) are views for explaining the locking operation of the forklift.
Figure 7B:
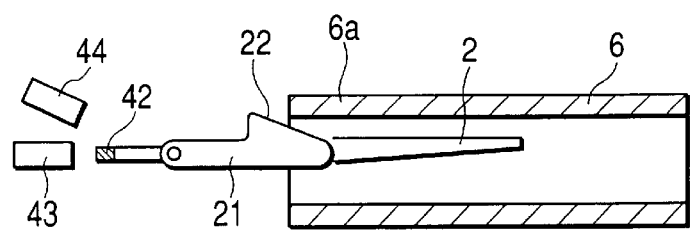
Figure 7C:
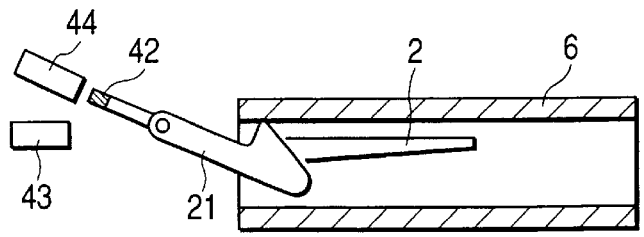

As shown in FIGS. 7(a) to 7(d), in the pallet lock device 20, there are provided sensors to detect a movement of each portion. On the back of the bracket 23 which fixes the lock bar 21, there is provided a magnet 42 which is a member marked with black in the drawing. There are provided a pallet detection sensor 43 and a landing detection sensor 44 which are magnetic sensors to output a detection signal when the sensors are turned on or off by the magnetic force of the magnet 42. As shown in FIGS. 7(a) and 7(b), the pallet detection sensor 43 is turned on by the magnet 42 when the lock bar 21 is set horizontal. As shown in FIG. 7(c), the landing detection sensor 44 is turned on by the magnet 42 when a top end of the lock bar 21 is rotated downward by a predetermined angle.

Figure 6:
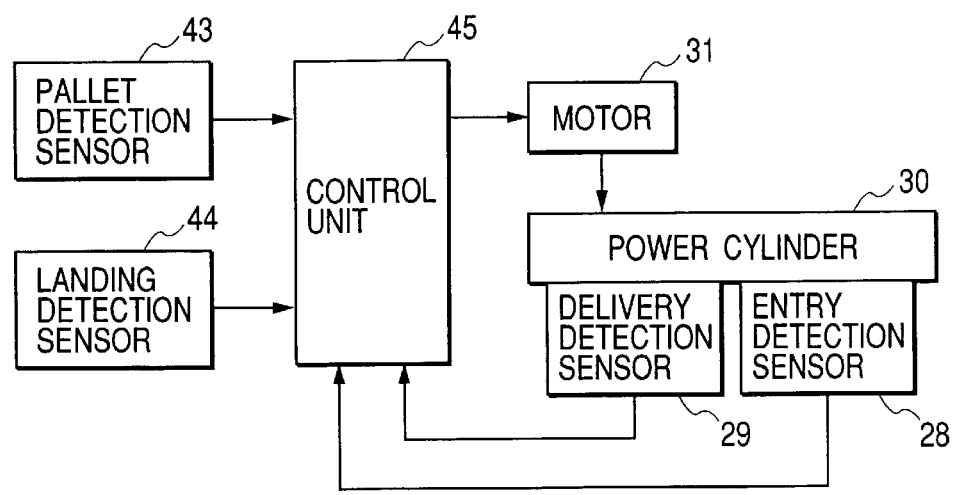
FIG. 6 is a block diagram showing a drive circuit of the pallet lock device.

FIG. 6 is a block diagram relating to control of the pallet lock device 20. Signals sent from the pallet detection sensor 43 and the landing detection sensor 44 are inputted into the control unit 45 composed of a MPU, and the control unit 45 rotates the motor 31 in the normal and the reverse direction, so that the rod 32 of the power cylinder 30 can be extended and contracted and the locking and unlocking of the pallet 6 by the lock bar 21 are conducted.

The locking operation of the pallet 6 conducted by the pallet lock device 20 will be described below. First, as shown in FIG. 7(a), the fork 2 is inserted into the pallet 6 while the lock bar 21 is being maintained horizontal. Then, following the fork 2, the top end of the lock bar 21 is inserted into the pallet 6 as shown in FIG. 7(b). When the fork 2 is further inserted, an upper face of the tapered portion 22 of the lock bar 21 comes into contact with an end face of an upper deck board 6a of the pallet 6, and the lock bar 21 is tilted downward according to the tapered angle of the tapered portion 22. When the entire tapered portion 22 of the lock bar 21 is inserted into the pallet 6 as shown in FIG. 7(c), the fork 2 is completely inserted into the pallet 6 as shown in FIG. 3. At the same time, the lock bar 21 is rotated downward, and the magnet 42 moves upward from a position of the pallet detection sensor 43.

Figure 7D:
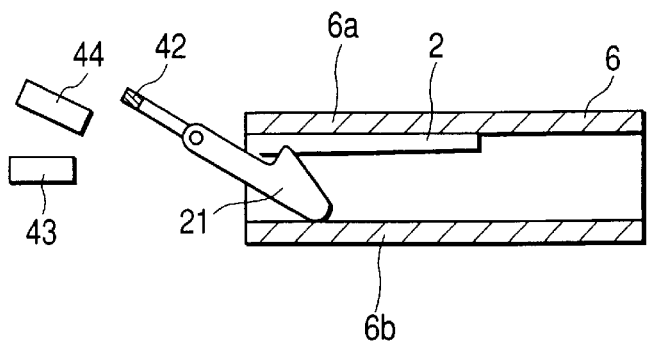

Hence, the pallet detection sensor 43 is turned off. The pallet detection signal sent from the pallet detection sensor 43 is inputted into the control unit 45. At the same time, the control unit 45 judges from the signals of the entry detection sensor 28 and the delivery detection sensor 29 that the rod 32 of the power cylinder 30 is not protruded. In this way, the control unit 45 judges that the rod 32 is not extended. When the control unit 45 receives these signals, it rotates the motor 31 in the normal direction, so that the rod 32 of the power cylinder 30 is extended and the lock bar 21 is further rotated downward. Hence, as shown in FIG. 7(d), the top end of the lock bar 21 pushes or comes into pressure contact with an upper face of the lower deck board 6b of the pallet 6 while the rod 32 of the power cylinder 30 is being extended. Due to the above operation, the pallet 6 is locked by the lock bar 21. At the same time, when the control unit 45 detects a signal of the delivery detection sensor 29 to detect that the rod 32 of the power cylinder 30 has been extended, it is judged that the lock bar 21 has locked the pallet 6, and the motor 31 is stopped. When the fork 2 is lifted under the above condition, the pallet 6 is lifted by the upper face of the fork 2. When the fork 2 is further lifted, the lock bar 21 is further rotated downward by an elastic force of the damper 40. Therefore, the lock bar 21 further pushes the lower deck board 6b. In this way, the pallet 6 is positively locked by the fork 2 and the lock bar 21 when the pallet 6 is a little lifted by the fork 2 as shown in FIG. 7(d). Therefore, it is possible to prevent the pallet 6 from oscillating or sliding on the fork, and the occurrence of accidents can be prevented and operation can be safely executed.

In the above example, the fork 2 is inserted into the pallet 2 at a position close to the upper deck board 6a. If the fork 2 is inserted into the pallet 2 at a position not close to the upper deck board 6a (the fork 2 is inserted into the pallet 2 at a position close to the lower deck board 6b, for example), the lock bar 21 does not come into contact with the upper deck board 6a and the lock bar 21 is not rotated simultaneously with the insertion. Or, the landing detection sensor 44 is not changed from ON to OFF since the tilting angle of the lock bar 21 is small. However, when the fork 2 is lifted after the insertion in the same manner as above described, the tapered portion 22 at the top end comes into contact with the upper deck board 6a. Therefore, the lock bar 21 is rotated downward when the fork 2 reaches to a position close to the lower face of the upper deck board 6a of the pallet 6, and the pallet 6 is locked. As a result, the same operation as above described is conducted regardless of the inserting position of the fork.

Under the condition shown in FIG. 7(d), the magnet 42 is remote from the pallet detection sensor 43 and the landing detection sensor 44. Therefore, both the sensors 43, 44 are turned off. By the signals of turning off the sensors 43, 44 and the signal sent from the delivery detection sensor 29, the control unit 45 controls the power cylinder 30 and the pallet 6 is locked by the lock bar 21 until a release signal described later is inputted into the control unit 45.

As described above, when the fork 2 is inserted into the pallet 6, the lower deck board 6b is pushed by the lock bar 21, so that the pallet 6 is locked. After that, when the fork 2 is elevated, the upper deck board 6a of the pallet 6 is pushed and supported by an upper face of the fork 2, and the lower deck board 6b of the pallet 6 is pushed and supported by the lock bar 21. Therefore, the pallet 6 can be more strongly locked.

In this embodiment, the locking operation of the pallet 6 is conducted when the pallet detection sensor 43 is changed from ON to OFF. This timing is set in such a manner that the fork 2 is inserted into the pallet 6 sufficiently deeply. Further, this timing is set at a point of time when the fork comes close to the upper deck board 6a of the pallet 6 in the vertical direction or after the fork comes into contact with the upper deck board 6a. In case where the pallet lock device 20 is operated while the fork is located being distant from the deck board 6a on the upper side of the pallet 6, the fork lifts up the pallet 6 under the condition that the lock bar 21 strongly pushes the lower deck board 6b downward. Therefore, the fork 2 crashes onto the upper deck board 6a by a reaction force of the lock bar 21. Accordingly, a force acting on the pallet 6 greatly changes and the pallet 6 is oscillated. In the above embodiment, since the pallet 6 is lifted up by the fork 2 when the fork 2 comes to a position close to the upper deck board 6a or after the fork 2 comes into contact with the upper deck board 6a, the upper deck board 6a is contacted with and supported by the fork 2 even if the pallet 6 is oscillated. In the above embodiment, a fork position detector includes the lock bar 21 having the tapered portion 22 and the magnet 42, and the pallet detection sensor 43.

The tapered portion 22 is located close to the base end portion of the fork 2, a little protruding backwards from the base end portion of the fork 2. That is, a position of the tapered portion 22 is set at a position so that the pallet detection sensor 43 can be changed from ON to OFF just before the pallet 6 completely reaches to the base end portion of the fork 2. A rotating angle of the tapered portion 22 by the insertion of the fork 2 changes by the tapered angle of the tapered portion and also by the insertion height position of the fork 2 into the pallet 6. Therefore, the rotating angle of the tapered portion 22 is set with sufficient consideration so that the pallet detection sensor 43 can be changed from ON to OFF at a point of time when the fork 2 is sufficiently inserted into the pallet 6.

Figure 8A:
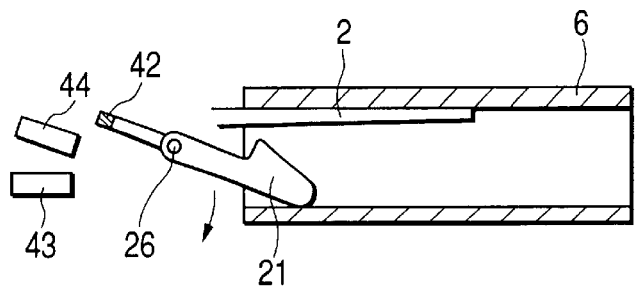
FIGS. 8(a) to 8(c) are views for explaining the unlocking operation of the forklift.
Figure 8B:
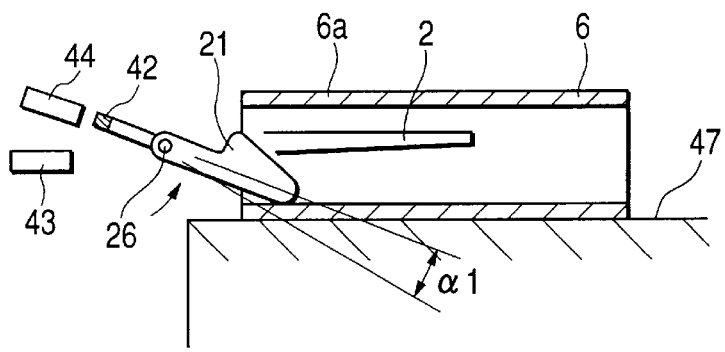

The unlocking operation of the pallet lock device 20 will be described below. FIG. 8(a) is a view showing a state in which the pallet 6 is locked by the lock bar 21 and the fork 2 which lifts up the pallet 6 so as to convey a load. Under this condition, the lock bar 21 is pushed downward shown by an arrow in the drawing, and the magnet 42 is remote from the position of the landing detection sensor 44. Therefore, both the landing detection sensor 44 and the pallet detection sensor 43 are turned off. When the fork 2 is lowered as shown in FIG. 8(b), so that the pallet 6 is set in the setting section 47 such as a shelf or ground, the fork 2 is separated and lowered from the upper deck board 6a. Accordingly, the lock bar 21 is pushed upward by the lower deck board 6b and the lock bar 21 is rotated counterclockwise round the shaft 26 resisting a spring force generated by the damper 40. When the rotating angle of the lock bar 21 reaches a predetermined angle α1, the magnet 42 is located at a position in the vicinity of the landing detection sensor 44 and the landing detection sensor 44 is turned on by the magnet 42.

Figure 8C:
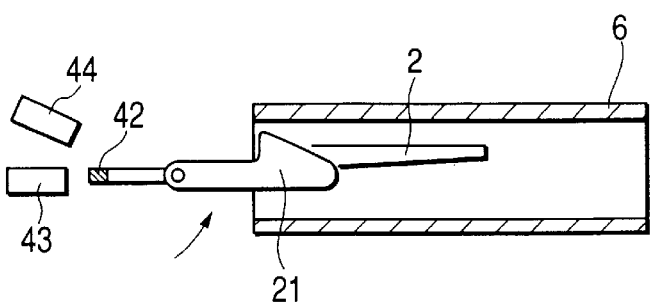

ON signal of the landing detection sensor 44 is inputted into the control unit 45. Then the control unit 45 reverses the motor 31, and the rod 32 of the power cylinder 30 is accommodated. In this way, as shown in FIG. 8(c), the lock bar 21 is rotated to the initial horizontal state, and the lock of the pallet 6 is released. When the entry detection sensor 28, which detects that the rod 32 of the power cylinder 30 has entered the cylinder, is turned on, the control unit 45 recognizes that the lock has been released. Under the above condition, the forklift 1 is retracted so as to drawn out the fork 2 from the pallet 6.

According to this embodiment, unlocking of the lock bar 21 is automatically conducted. Since the pallet 6 is locked by the lock bar 21 from a time when the pallet 6 is lifted by the fork 2 to a time when the pallet 6 reaches a shelf or ground, there is no possibility that the pallet 6 is oscillated on the pallet 6 or drawn out from the fork 2. Therefore, the safety of operation is enhanced. Further, it can be automatically detected that the pallet 6 has been put on a shelf or ground, and the pallet 6 is automatically released from the lock bar 21 by the detection signal. Therefore, the efficiency of loading and unloading work is remarkably enhanced as compared with a conventional case in which the lock of the lock bar 21 is manually released. In this embodiment, the landing detection sensor 44 and the control unit 45 which contracts the power cylinder 30 according to ON signal of the landing detection sensor 44 serves as a lock release means. In order to prevent the occurrence of an accidental release of the lock caused by the vibration generated while the forklift 1 is running, the predetermined angle α1 described in the above embodiment must be set at an angle larger than a range in which the lock bar 21 is rotated by the vibration. In the above embodiment, the damper 40 is used so that the lock bar 21 can be rotated upward in the case of releasing the lock, however, other means are applicable to the present invention. It should be noted that the present invention is not limited to the embodiments as herein described, and variations may be made without departing from the sprit and scope of the invention.

As the pallet detector for detecting the insertion of the fork into the pallet, the lock bar and the pallet detection sensor 43 are used in the above embodiment. The lock bar is pivotally arranged being pushed by a spring and the tapered portion is arranged at the top upper portion of the lock bar. However, the pallet detector of the present invention is not limited to the above specific embodiment but variations may be made. For example, only when a micro switch for detecting the pallet is arranged at a position close to the base end portion of the fork, the same operation and effect can be provided. As for the pallet lock device, lock bar or drive unit of the lock bar, variations may be made by one skilled in the art without departing from the spirit and scope of the present invention. The present invention includes all these variations.

Also, it is possible to apply the present invention to various types of forklifts such as a reach type forklift and a counter balance type forklift.

A second embodiment of the present invention will be described.

Figure 9:
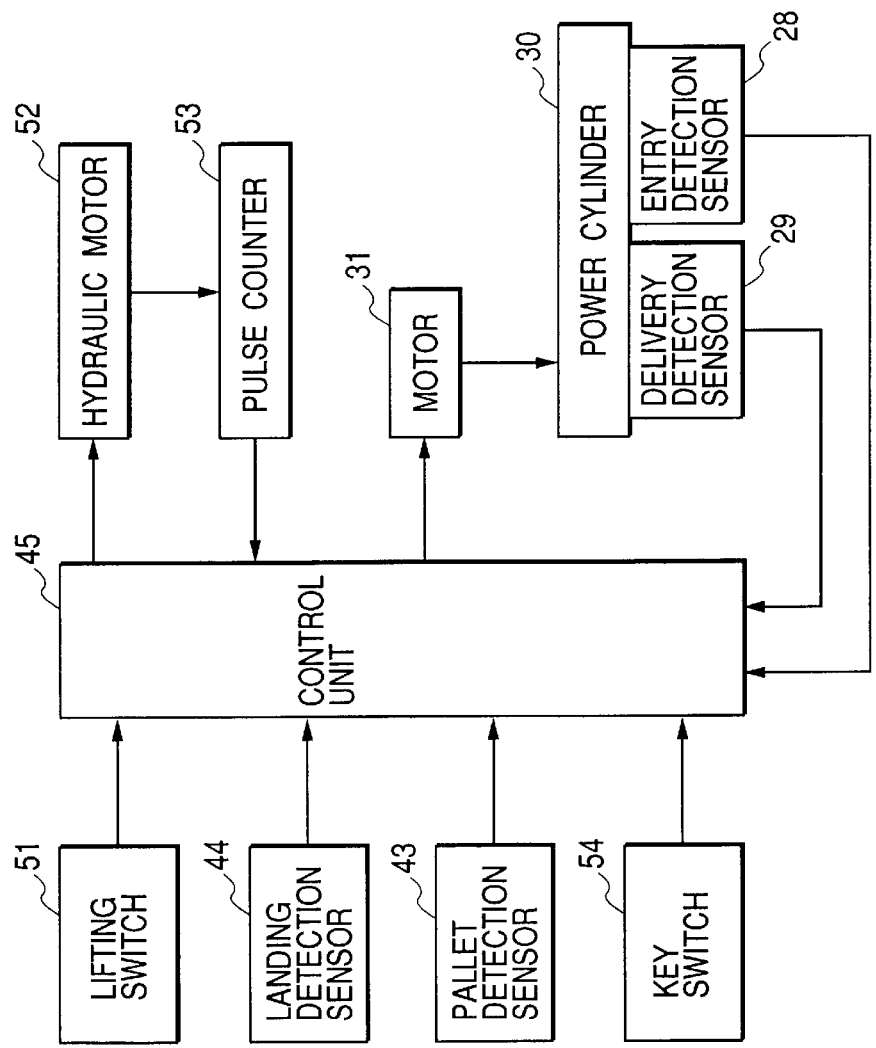
FIG. 9 is a block diagram showing a pallet lock device of a second embodiment.
Figure 10:
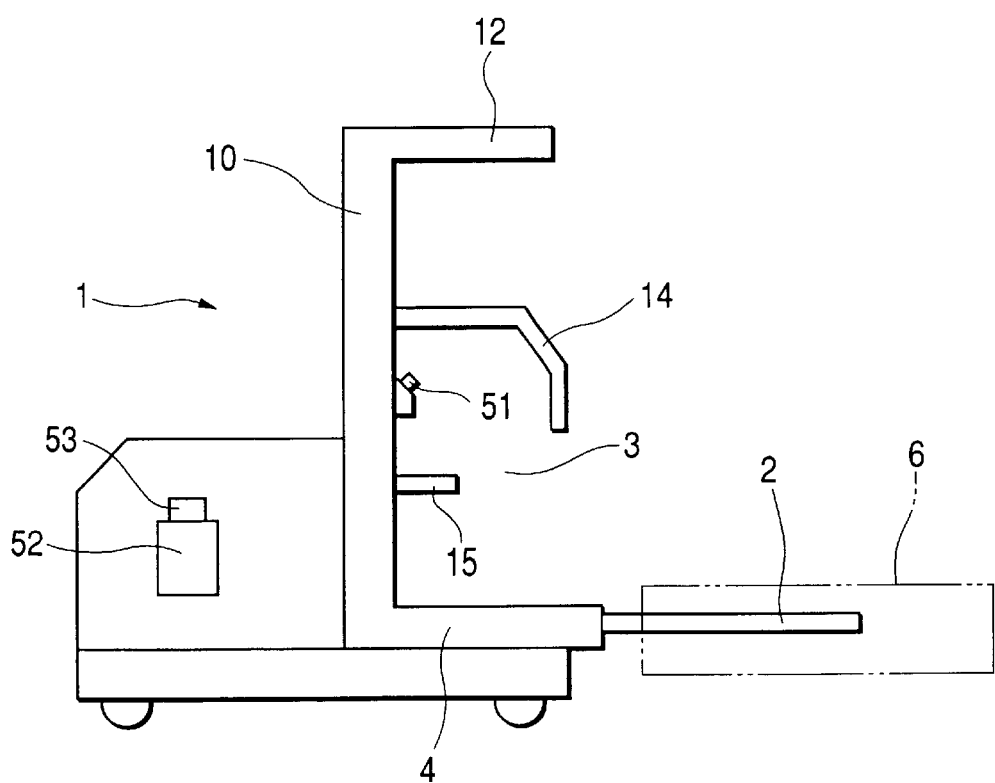
FIG. 10 is a schematic side view of a forklift of the second embodiment.

FIG. 9 is a block diagram of a pallet lock device according to a second embodiment. Signals sent from the pallet detection sensor 43 and the landing detection sensor 44 are inputted into the control unit 45 composed of a MPU, and the control unit 45 rotates the motor 31 in the normal and the reverse direction, so that the rod 32 of the power cylinder 30 is extended and contracted and the lock/unlock of the pallet 6 by the lock bar 21 are conducted. A signal sent from the landing detection sensor 44 and a signal generated by operating a lifting switch 51 are used for locking the pallet 6 by the lock bar 21. In a hydraulic motor 52 (shown in FIGS. 9 and 10) which drives a lifting cylinder (not shown) so as to lift the operator's stand 3 and the forks 2, there is provided a pulse counter 53 which is an upward movement detector composed of an encoder to detect the number of revolutions. A signal sent from this pulse counter 53 is inputted into the control unit 45. A detection signal sent from the entry detection sensor 28 for detecting a position of the rod 32 of the power cylinder 30 in the case of unlocking the pallet 6 is inputted into the control unit 45. A detection signal sent from the delivery detection sensor 29 for detecting a position of the rod 32 of the power cylinder 30 in the case of locking the pallet 6 is also inputted into the control unit 45. A signal sent from a key switch 54 to turn on and off the electric power source of the entire forklift 1 is also inputted into the control unit 45.

Referring to FIGS. 7(a) to 7(d) and FIG. 11, operation of locking the pallet 6 by the pallet lock device 20 will be described. First, as shown in step S1 in FIG. 11, the operator turns on the key switch 54 and the forks 2 are inserted into the pallet 6 while the lock bar 21 is being maintained in a horizontal state as shown in FIG. 7(a). Then, following the fork 2, a top end of the lock bar 21 is inserted into the pallet 6 as shown in FIG. 7(b). When the fork 2 is further inserted, an upper face of the tapered portion 22 of the lock bar 21 comes into contact with an end face of the upper deck board 6a of the pallet 6, and the lock bar 21 is tilted downward according to the tapered angle of the tapered portion 22. When the entire tapered portion 22 of the lock bar 21 is inserted into the pallet 6 as shown in FIG. 7(c), the fork 2 is completely inserted into the pallet 6 as shown in FIG. 3. Since the lock bar 21 is rotated downward, the magnet 42 moves from the position of the pallet detection sensor 43 to the position of the landing detection sensor 44.

Figure 11:
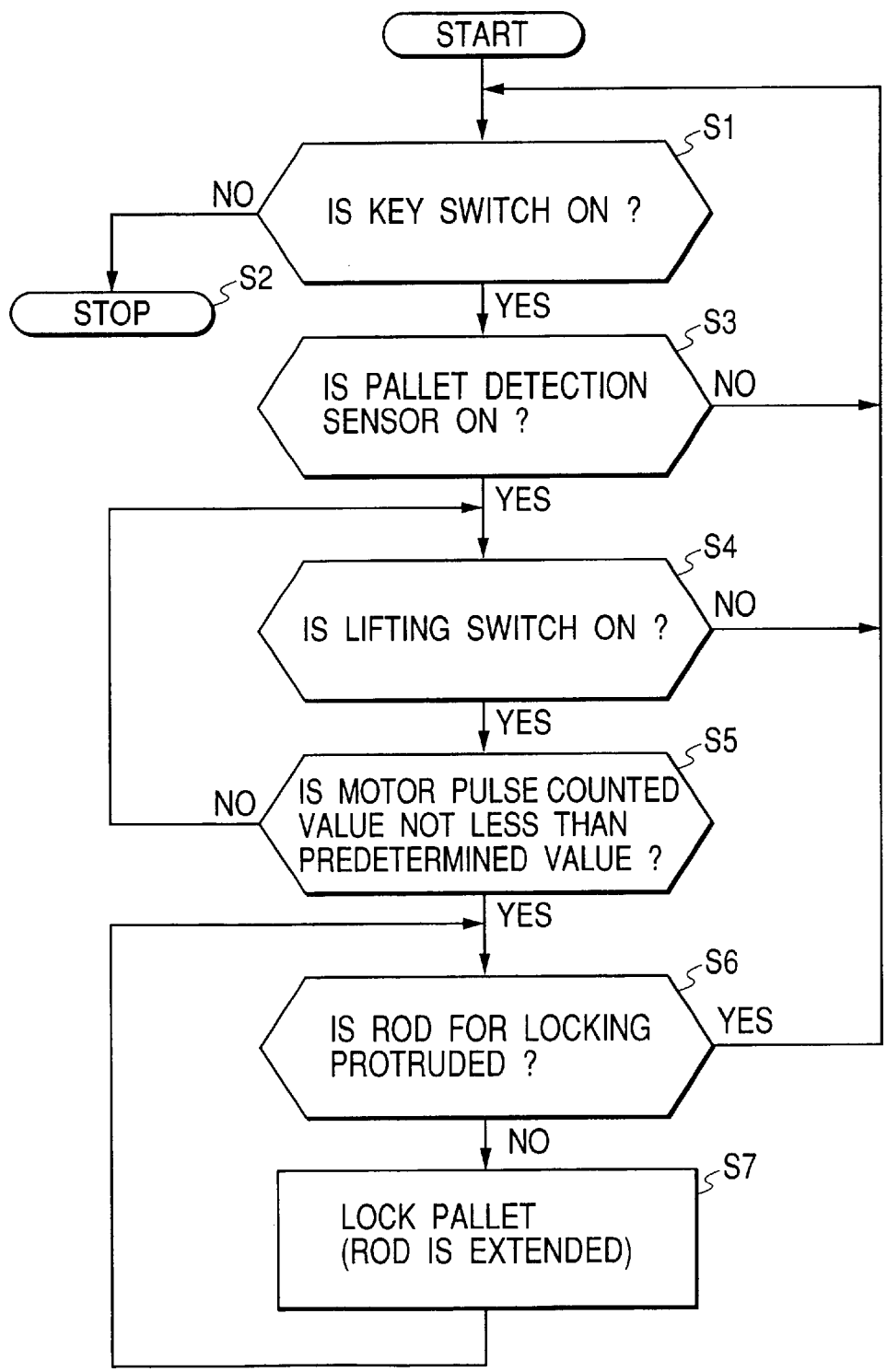
FIG. 11 is a flow chart showing a control operation in case of locking a pallet in the second embodiment.

Hence, the pallet detection sensor 43 is turned off, and the landing detection sensor 44 is turned on as shown in step S3 in FIG. 11, and then signals of these sensors 43, 44 are taken into the control unit 45. The insertion of the fork 2 into the pallet 2 is detected and judged by the control unit 45 when the pallet detection sensor 43 is changed from ON to OFF. After the pallet 6 has been detected by the pallet detection sensor 43, the operator turns on the lifting switch 51 as shown in step S4, and the hydraulic motor 52 for driving the fork 2 and lifting the operator's stand 3 is rotated. Pulses generated when the hydraulic motor 52 is rotated is counted by the pulse counter 53. As shown in step S5, when the number of pulses reaches a predetermined value, that is, when it is detected by the control unit 45 that the fork 2 has lifted to a position higher than a predetermined height, the program proceeds to step S6. In step S6, it is judged by the signals sent from the entry detection sensor 28 and the delivery detection sensor 29 that the rod 32 of the power cylinder 30 is not protruded. If the rod 32 of the power cylinder 30 is not protruded (extended), the program proceeds to step S7.

In step S7, the control unit 45 rotates the motor 31 in the normal direction so as to extend the rod 32 of the power cylinder 30, and the lock bar 21 is further rotated downward. While the rod 32 of the power cylinder 30 is being extended, the top end portion of the lock bar 21 pushes or comes into pressure contact with an upper face of the lower deck board 6b of the pallet 6 as shown in FIG. 7(d). Hence, the pallet 6 is locked by the lock bar 21 as shown in step S7 in FIG. 11. When the key switch 54 is turned off in step S1 in FIG. 11, the program proceeds to step S2 and the stopping state is maintained.

In this case, a lifting distance of the fork 2 from a time when the fork 2 is lifted to a time when the power cylinder 30 is driven is determined, for example, to be a height of the space in the pallet 6 into which the fork 2 is inserted. Alternatively, the lifting distance is determined to be a half of the height of the space in the pallet 6. When the lifting distance of the fork 2 is determined as described above, the pallet 6 can be locked immediately after it is lifted up by the fork 2. Of course, the lifting distance is not limited to as herein described. The lifting distance can be arbitrarily determined. This lifting distance is judged in such a manner that the number of revolution pulses of the hydraulic motor 52 corresponding to the lifting distance is previously set, and the number of pulses is counted until it reaches this number in step S5 in FIG. 11.

Under the condition shown in FIG. 7(d), the magnet 42 is remote from the pallet detection sensor 43 and the landing detection sensor 44. Therefore, the pallet detection sensor 43 and the landing detection sensor are turned off. By the signals of turning off the sensors 43, 44, the control unit 45 controls the power cylinder 30 and the pallet 6 is locked by the lock bar 21 until a release signal described later is inputted into the control unit 45.

As described above, when the fork 2 is inserted into the pallet 6, the pallet 6 is detected by the pallet detection sensor 43. When the operator pushes the lifting switch 51 and the fork 2 is lifted by a predetermined distance, the pallet lock device 20 is driven and the pallet 6 is automatically locked by the lock bar 21. Therefore, when the operator gets on the pallet 6 and conducts loading and unloading work, the pallet 6 is completely locked by the lock bar 21. Accordingly, there is no possibility that the pallet 6 is put into an unstable state. Therefore, the operator can safely execute loading and unloading work. Since the pallet 6 can be automatically locked, the operator does not forget to lock the pallet 6. Accordingly, the occurrence of accidents can be previously prevented.

The unlocking operation of the pallet lock device 20 will be described. FIG. 8(a) is a view showing a state in which the pallet 6 is locked by the lock bar 21 and the fork 2 lifts up the pallet 6 so as to convey a load. Under the above condition, the lock bar 21 is pushed in the lower direction shown by an arrow in the drawing, and the magnet 42 is remote from the position of the landing detection sensor 44. Therefore, both the landing detection sensor 44 and the pallet detection sensor 43 are turned off. Next, as shown in FIG. 8(b), the fork 2 is lowered, so that the pallet 6 is set in the setting section 47 such as a shelf or ground. Then, the fork 2 is separated and lowered from the upper deck board 6a of the pallet 6. The shaft 26 of the lock bar 21 is lowered together with the fork 2. Therefore, the lock bar 21 rotates counterclockwise round the shaft 26 by the angle α1. Due to the rotation of the lock bar 21, the magnet 42 is rotated to the position of the landing detection sensor 44. Therefore, the landing detection sensor 44 is turned on by the magnet 42.

ON signal of the landing detection sensor 44 is inputted into the control unit 45. The control unit 45 reverses the motor 31, and the rod 32 of the power cylinder 30 is accommodated. In this way, as shown in FIG. 8(c), the lock bar 21 is rotated to the horizontal state, and the lock of the pallet 6 is released. Under the state in which the rod 32 of the power cylinder 30 is accommodated, the lock bar 21 is naturally put into the horizontal state (the state in which the lock is released). When the magnet 42 is located at a position corresponding to the position of the pallet detection sensor 43, it is judged that the pallet detection sensor 43 is turned on, and it is also judged from the signals of the entry detection sensor 28 and the delivery detection sensor 29 that the rod 32 of the power cylinder 30 is accommodated. Hence, the control unit 45 recognizes that the lock has been released.

A third embodiment of the present invention will be described.

Figure 12:
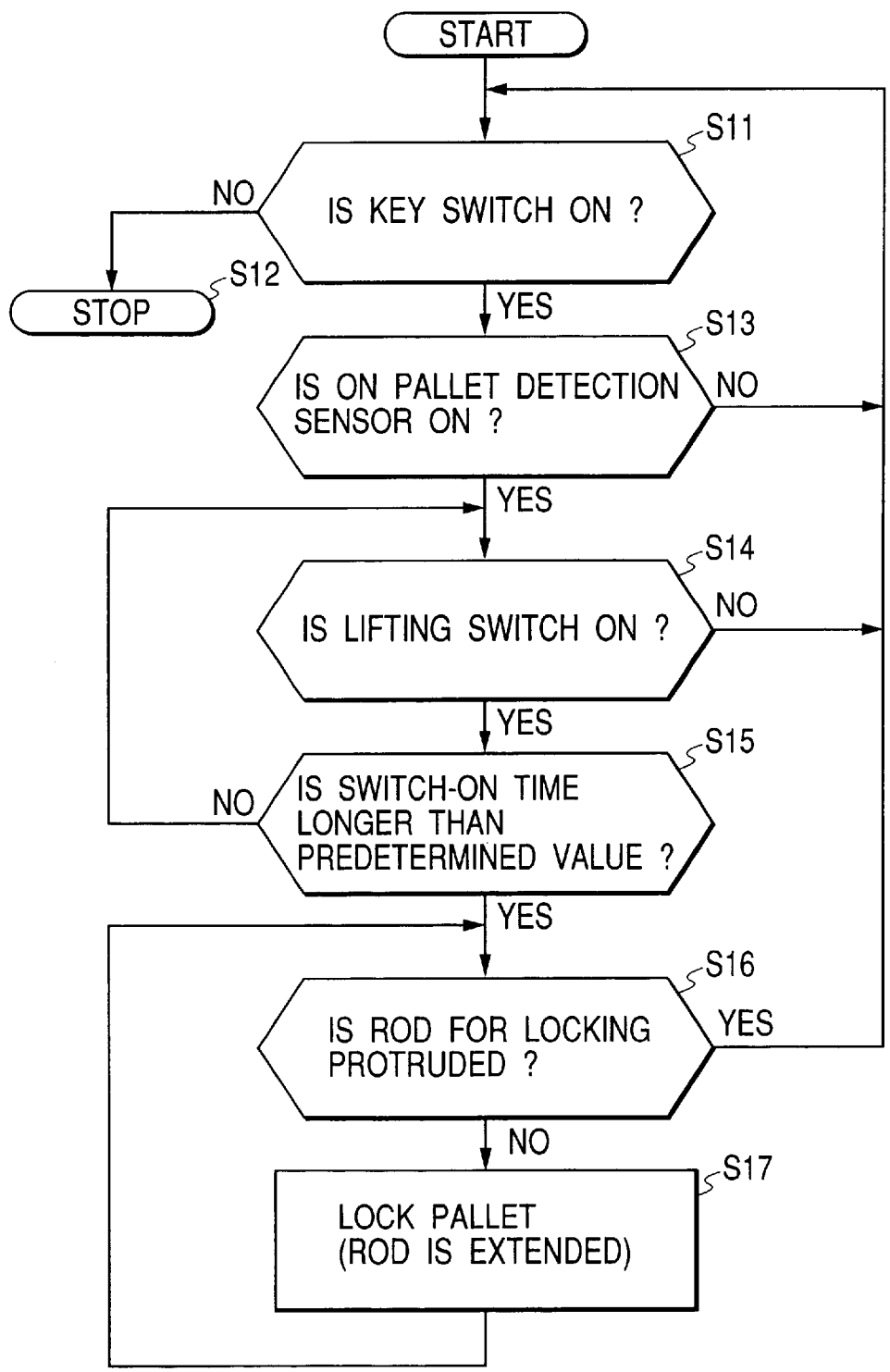
FIG. 12 is a flow chart showing a control operation in case of locking a pallet in a third embodiment.

Step S15 in a flow chart shown in FIG. 12 is different from the flow chart shown in FIG. 11 described before. Other steps in the flow chart shown in FIG. 12 are the same as those of the flow chart shown in FIG. 11. That is, while the fork 2 is being inserted into the pallet 6, the pallet 6 is detected by the pallet detection sensor 43 as shown in step S13, and the operator pushes the push button type lifting switch 51 as shown in step S14. Next, the program proceeds to step S15. When a period of time in which the lifting switch 51 is being pushed exceeds a predetermined period of time, that is, when a period of time in which the lifting switch 51 is being pushed exceeds a period of time necessary for lifting the upper deck board 6a of the pallet 6, the control unit 45 drives the power cylinder 30 via the motor 31. Hence, the lock bar 21 rotates downward and locks the pallet 6. In this embodiment, when the lifting speed of the fork 2 is substantially constant, the lifting height of the fork is found by the product of the lifting speed and the pushing operation time. In case where the lifting speed of the fork 2 is not constant, a sensor to detect the speed may be added, and the fork height may be found by the product of the output of the sensor and the pushing operation time, and this may be compared with a predetermined value.

A fourth embodiment of the present invention will be described.

Figure 13:
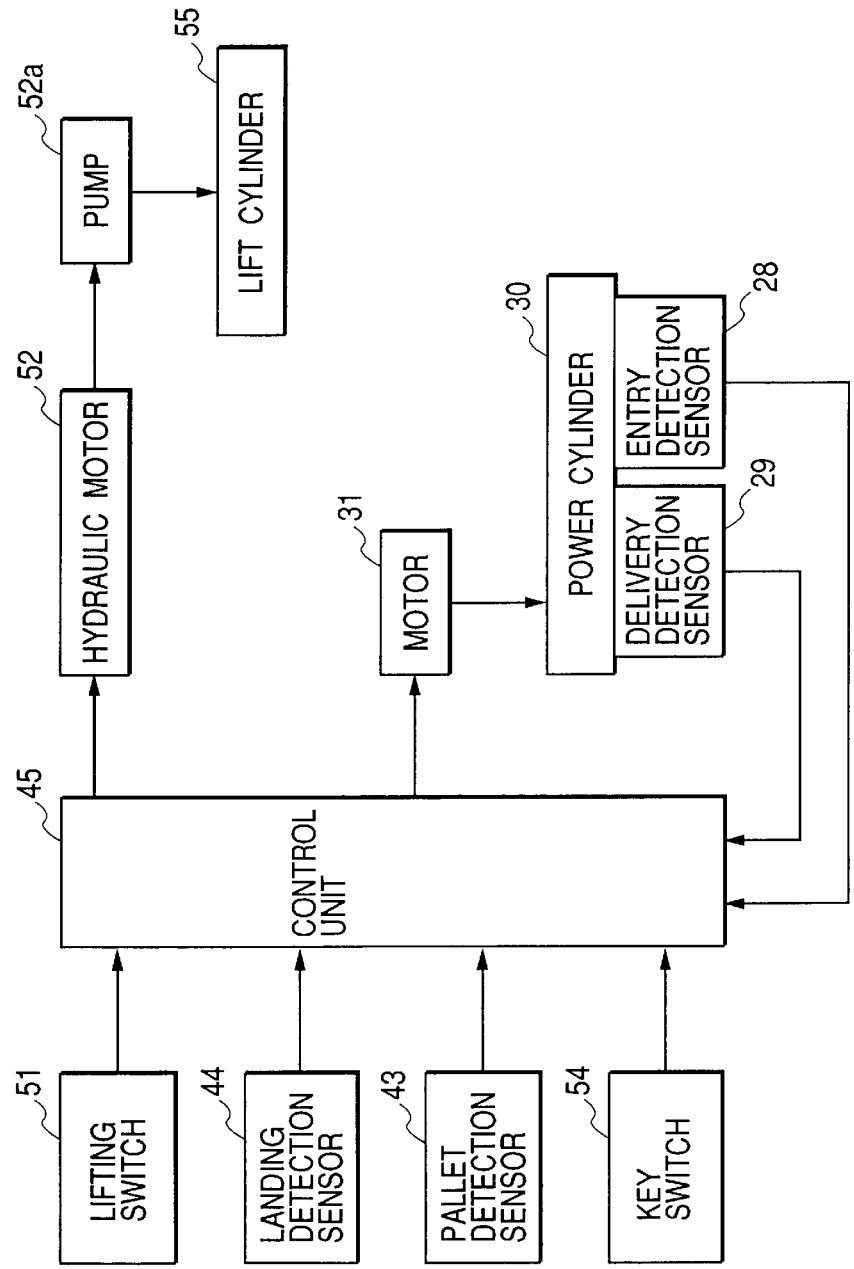
FIG. 13 is a block diagram showing a pallet lock device of a fourth embodiment.

FIG. 13 is a block diagram showing a pallet lock device of a fourth embodiment. Signals sent from the pallet detection sensor 43 and the landing detection sensor 44 are inputted into the control unit 45 composed of a MPU, and the control unit 45 rotates the motor 31 in the normal and the reverse direction, so that the rod 32 of the power cylinder 30 can be extended and contracted, and the lock/unlock of the pallet 6 by the lock bar 21 is conducted. In this embodiment, when the lock bar 21 locks the pallet 6, a signal sent from the pallet detection sensor 43 and a lifting start signal, which is made when the lifting switch 51 for lifting the operator's stand 3 is turned on, are used. A lift cylinder 55 for lifting the operator's stand, to which the fork 2 is integrally disposed, is arranged in the vehicle body. The hydraulic motor 52 for driving a pump 52a is driven and controlled by the control unit 45, and the lift cylinder 55 is driven. A detection signal of the entry detection sensor 28 for detecting a position of the rod 32 of the power cylinder 30 in case of releasing the lock of the pallet 6 is inputted into the control unit 45. Further, a detection signal of the delivery detection sensor 29 for detecting a position of the rod 32 of the power cylinder 30 in case of locking the pallet 6 is inputted into the control unit 45. Furthermore, a signal sent from the key switch 54 for turning on and off the electric power source of the entire forklift 1 is inputted into the control unit 45.

Referring to FIGS. 7(a) to 7(d) and FIG. 14, operation of locking the pallet 6 by the pallet lock device 20 will be described. First, as shown in step S1 in FIG. 14, the operator turns on the key switch 54 and the forks 2 are inserted into the pallet 6 while the lock bar 21 is being maintained in a horizontal state as shown in FIG. 7(a). Then, following the fork 2, a top end of the lock bar 21 is inserted into the pallet 6 as shown in FIG. 7(b). When the fork 2 is further inserted, an upper face of the tapered portion 22 of the lock bar 21 comes into contact with an end face of the upper deck board 6a of the pallet 6, and the lock bar 21 is tilted downward according to the tapered angle of the tapered portion 22. When the entire tapered portion 22 of the lock bar 21 is inserted into the pallet 6 as shown in FIG. 7(c), the fork 2 is completely inserted into the pallet 6 as shown in FIG. 3. Since the lock bar 21 is rotated downward, the magnet 42 moves from the position of the pallet detection sensor 43 to the position of the landing detection sensor 44.

As shown in step S2, when the pallet detection sensor 43 is changed from ON to OFF, the insertion of the fork 2 into the pallet 6 is detected. After the detection of the insertion of the fork 2 into the pallet 6, as shown in step S3, the operator turns on the lifting switch 51. When this lifting switch 51 is turned on, the lifting cylinder 55 is driven by the control unit 45 via the hydraulic motor 52 and the pump 53, so that the operator's stand 3 and the fork 2 are lifted up. At the same time, in step S4, it is judged by the signals sent from the entry detection sensor 28 and the delivery detection sensor 29 that the rod 32 of the power cylinder 30 is not protruded. In this way, the control unit 45 judges that the rod 32 is not protruded (extended).

When these signals are given to the control unit 45, the motor 31 is rotated in the normal direction, so that the rod 32 of the power cylinder 30 is extended as shown in step S5 and the lock bar 21 is further rotated downward. While the rod 32 of the power cylinder 30 is being extended, as shown in FIG. 7(d), a top end portion of the lock bar 21 is pushed or comes into pressure contact with an upper face of the lower deck board 6b of the pallet 6. Hence, the pallet 6 is locked by the lock bar 21.

Under the condition shown in FIG. 7(d), the magnet 42 is remote from the pallet detection sensor 43 and the landing detection sensor 44. Therefore, the pallet detection sensor 43 and the landing detection sensor are turned off. By the signals of turning off the sensors 43, 44, the control unit 45 controls the power cylinder 30 and the pallet 6 is locked by the lock bar 21 until a release signal described later is inputted into the control unit 45.

As described above, when the fork 2 is inserted into the pallet 6, the pallet 6 is detected by the pallet detection sensor 43. Further, when the operator pushes the lifting switch 51, the pallet lock device 20 is driven and the pallet 6 is automatically locked by the lock bar 21. Therefore, when the operator gets on the pallet 6 and conducts loading and unloading work, the pallet 6 is completely locked by the lock bar 21. Accordingly, there is no possibility that the pallet 6 is put into an unstable state. Therefore, the operator can safely execute loading and unloading work. Since the pallet 6 can be automatically locked, the operator does not forget to lock the pallet 6. Accordingly, the occurrence of accidents can be previously prevented.

Next, operation of releasing the lock of the pallet lock device 20 will be described referring to FIGS. 8(a) to 8(c) and FIG. 14. FIG. 8(a) is a view showing a state in which the pallet 6 is locked by the lock bar 21 and the fork 2 lifts up the pallet 6 so as to convey a load. Under the above condition, the lock bar 21 is pushed in the lower direction shown by an arrow in the drawing, and the magnet 42 is remote from the position of the landing detection sensor 44. Therefore, both the landing detection sensor 44 and the pallet detection sensor 43 are turned off. Next, as shown in FIG. 8(b), the fork 2 is lowered, so that the pallet 6 is set in the setting section 47 such as a shelf or ground. Then, the fork 2 is lowered from the upper deck board 6a of the pallet 6. Therefore, the shaft 26 of the lock bar 21 is lowered together with the fork 2, and the lock bar 21 rotates counterclockwise round the shaft 26 by the angle α1. Due to the rotation of the lock bar 21, the magnet 42 is rotated to a position of the landing detection sensor 44, and the landing detection sensor 44 is turned on by the magnet 42.

Figure 14:
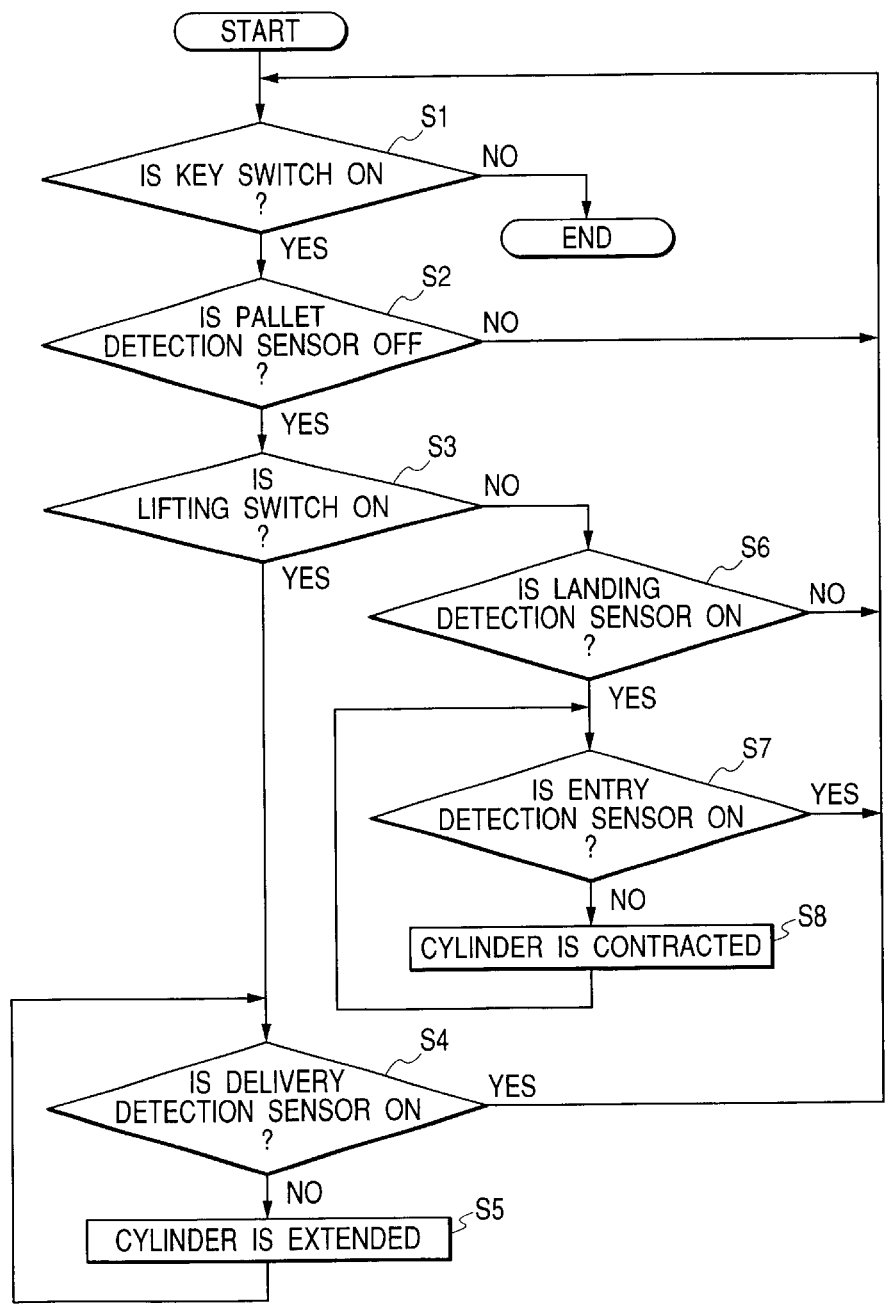
FIG. 14 is a flow chart showing a control operation in case of locking a pallet in the fourth embodiment.
Figure 15:
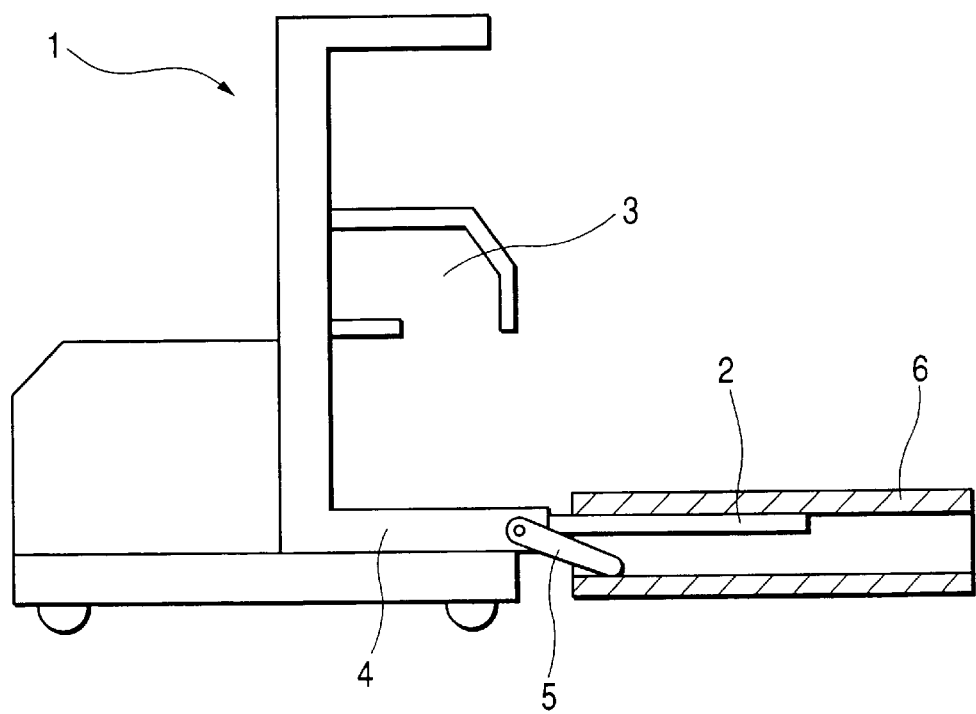
FIG. 15 is a side view of a conventional forklift.

ON signal of the landing detection sensor 44 is inputted into the control device 45 as shown in step S6 in FIG. 14. Then, the control device 45 reverses the motor 31, and the rod 32 of the power cylinder 30 is accommodated as shown in step S8. In this way, as shown in FIG. 8(c), the lock bar 21 is rotated to the horizontal state, and the lock of the pallet 6 is released. Under the state in which the rod 32 of the power cylinder 30 is accommodated, the lock bar 21 is naturally put into the horizontal state (the state in which the lock is released). The control unit 45 realizes that the lock has been released when the magnet 42 is located close to the position of the pallet detection sensor 43 and the pallet detection sensor 43 is turned on and also when it is judged from the signals sent from the entry detection sensor 28 and the delivery detection sensor 29 that the rod 32 of the power cylinder 30 has been accommodated. After the lifting switch 51 has been once turned on in step S3, even after the operator detaches his finger from the switch 51, the locking state can be maintained as long as the landing detection sensor 44 is not turned on in step S6.

In the above embodiment, when the lifting switch 51 is turned on, the pallet lock device 20 is operated. However, an actual movement of the fork 2 may be detected by a sensor or switch, and the pallet lock device 20 may be operated by the detection signal.

What is claimed is:

1. A forklift comprising:

a fork to be inserted into a pallet;

a hoisting device for hoisting the fork; and a pallet lock device for locking the pallet, the pallet lock device having a lock bar which is pushable a lower deck board of the pallet to lock the pallet, wherein the pallet lock device releases the lock of the pallet when an intensity of a force given to the lock bar from the lower deck board exceeds a predetermined value.

2. A forklift according to claim 1, wherein the pallet lock device releases the lock of the pallet when the lock bar is displaced upward by the force given from the lower deck board.

3. A forklift according to claim 2, wherein the pallet lock device comprises:

a lock bar driver for moving the lock bar upward and downward; and a detector for detecting an upward displacement of the lock bar caused by the force given from the lower deck board, wherein the lock bar driver releases the lock of the pallet when the detector detects the upward displacement of the lock bar.

4. A forklift according to claim 1, wherein the pallet lock device releases the lock of the pallet when the fork is operated to a state in which the fork is drawable out from the pallet.

5. A forklift according to claim 1, wherein the lock bar is supported on the pallet lock device via an elastic member for elastically pushing the pallet.

6. A forklift comprising:

a fork to be inserted into a pallet;

a hoisting device for hoisting the fork;

a pallet lock device for locking the pallet;

a pallet detector for detecting an insertion of the fork into the pallet; and an upward movement detector for detecting an upward movement of the fork, wherein the pallet lock device locks the pallet after the pallet detector detects the insertion of the fork into the pallet and the upward movement detector detects the upward movement of the fork of a predetermined distance.

7. A forklift according to claim 6, wherein the upward movement detector detects the upward movement of the fork of the predetermined distance based on an operating time of the hoisting device.

8. A forklift according to claim 6, wherein the hoisting device comprises a motor which is a drive source for hoisting the fork, wherein the upward movement detector detects the upward movement of the fork of the predetermined distance based on number of revolutions of the motor.

9. A forklift according to claim 6, wherein the pallet lock device comprises:

a lock bar which is pushable a lower deck board of the pallet; and a lock bar driver for moving the lock bar upward and downward.

10. A forklift according to claim 9, wherein the pallet lock device releases the lock of the pallet based on an upward force given from the lower deck board to the lock bar.

11. A forklift comprising:

a fork to be inserted into a pallet;

a hoisting device for hoisting the fork;

a pallet lock device for locking the pallet; and a pallet detector for detecting an insertion of the fork into the pallet, wherein the pallet lock device locks the pallet when the pallet detector detects that the pallet reaches a predetermined position close to a base end portion of the fork.

12. A forklift according to claim 11, wherein the pallet lock device comprises:

a lock bar which is pushable a lower deck board of the pallet, the lock bar having a tapered portion; and a lock bar driver for moving the lock bar upward and downward, wherein the tapered portion comes into contact with the pallet as the fork is inserted into the pallet and thereby the lock bar is tilted, wherein the pallet detector detects that the pallet reaches a predetermined position based on a tilting movement of the lock bar.

13. A forklift comprising:

a fork to be inserted into a pallet;

a hoisting device for hoisting the fork;

a pallet lock device for locking the pallet; and a pallet detector for detecting an insertion of the fork into the pallet, wherein the pallet lock device locks the pallet when the fork is hoisted by the hoisting device in state where the pallet detector detects the insertion of the fork into the pallet.

14. A forklift comprising:

a fork to be inserted into a pallet;

a hoisting device for hoisting the fork;

a pallet lock device for locking the pallet; and a fork position detector, wherein the pallet lock device locks the pallet when the fork position detector detects that the fork inserted into the pallet is located at the position close to the lower face of the upper deck board.

15. A forklift according to claim 14, further comprising a pallet detector for detecting an insertion of the fork into the pallet, wherein the pallet lock device locks the pallet when the pallet detector detects the insertion of the fork into the pallet and the fork position detector detects that the fork inserted into the pallet is located at a position close to a lower face of an upper deck board of the pallet.

16. A forklift comprising:

a fork to be inserted into a pallet;

a hoisting device for hoisting the fork; and a pallet lock device for locking the pallet, wherein the pallet lock device comprises:

a lock bar which is movable to a first position protruding from an upper face of the fork, a second position located lower than the first position, and a third position located lower than the second position and coming into contact with a lower deck board of the pallet;

a detector for detecting a displacement of the lock bar from the first position to the second position; and a lock bar driver for displacing the lock bar to the third position when the detector detects the displacement of the lock bar.

17. A forklift according to claims 16, wherein the fork lift is an order picking truck having an operator's stand which is hoisted together with the fork, wherein the pallet lock device is disposed on the operator's stand.

* * * * *